United States Patent [19]

Johnson et al.

[11] Patent Number: 4,628,265

[45] Date of Patent: Dec. 9, 1986

[54] METAL DETECTOR AND CLASSIFIER WITH AUTOMATIC COMPENSATION FOR SOIL MAGNETIC MINERALS AND SENSOR MISALIGNMENT

[75] Inventors: David E. Johnson, Los Banos; Richard W. Williams, Dos Palos, both of Calif.

[73] Assignee: FRL, Inc., Los Banos, Calif.

[21] Appl. No.: 487,699

[22] Filed: Apr. 22, 1983

[51] Int. Cl.[4] .......................... G01V 3/08; G01V 3/10; G01N 33/12; G01R 27/72

[52] U.S. Cl. .................................... 324/329; 324/233; 324/225

[58] Field of Search ................ 324/233, 243, 326–329, 324/225, 354, 355

[56] References Cited

U.S. PATENT DOCUMENTS

| | | | |
|---|---|---|---|
| 3,573,784 | 4/1971 | Bachofer et al. | 324/243 |
| 3,614,600 | 10/1971 | Ronka | 324/334 |
| 3,676,772 | 7/1972 | Lee | 324/233 |

Primary Examiner—Ernest F. Karlsen
Assistant Examiner—Walter E. Snow
Attorney, Agent, or Firm—Flehr, Hohbach, Test, Albritton & Herbert

[57] ABSTRACT

Metal detector for locating and classifying metal objects of different types in the ground or other surroundings. Automatic compensation is provided for signals produced by magnetic materials in the soil and by misalignment of the coils in the sensing head.

13 Claims, 3 Drawing Figures

FIG_1

FIG_2

FIG_3

METAL DETECTOR AND CLASSIFIER WITH AUTOMATIC COMPENSATION FOR SOIL MAGNETIC MINERALS AND SENSOR MISALIGNMENT

This invention pertains generally to metal detectors, and more particularly to a metal detector for locating and classifying metal objects in the soil.

Metal detectors are utilized in a variety of applications such as finding lost coins and jewelry, detecting metallic minerals in ores, and detecting objects in an industrial material stream. Such detectors typically operate by transmitting an alternating magnetic field of a few kilohertz which is monitored with a receiver to detect the presence of metal objects. Due to their electrical and magnetic properties, metal objects provide phase changes in the received signals which are characteristic of the objects in question. Thus by monitoring the received signals it is possible to detect the presence of a metal object and to classify it according to the phase character of the received signals.

In many instances, the ground soil contains magnetically susceptible minerals, particularly magnetite, which concentrate the magnetic flux in their vicinity, producing changes in the received signal. Misalignment of the receiving sensor relative to the transmitter, typically caused by mechanical movement brought about by temperature changes, aging, and vibration, also causes changes in the received signal.

In the prior art, false signals caused by magnetic minerals and/or by sensor misalignment are customarily eliminated by synchronously demodulating the received signal in phase quadrature with respect to the phase of signals produced by magnetic minerals and sensor misalignment, which are characteristically of the same phase and which differ in phase from signals resulting from metal objects. Due to the practical necessity of bandpass filtering the received signal prior to demodulation, and due to the phase difference between the transmitter excitation voltage and the transmitter field caused by transmitter coil resistance, the phase relationship between the transmitted field and the received bandpassed signals is subject to considerable uncertainty and to drift. In the prior art this typically results in the need for the operator to periodically adjust the phase shift of the phase reference circuitry in order to maintain immunity to signals from magnetic minerals and sensor misalignment, which signals are frequently orders of magnitude stronger than the signals from the metal objects to be detected. Furthermore, the signals thus demodulated contain no information whereby different types of metal objects may be classified. In the prior art, phase information whereby metal objects may be classified is typically obtained from a second demodulator operating at phase other than at quadrature with respect to misalignment and magnetic mineral signals, but this demodulator is then subject to interference from those sources. In the prior art, this interference is customarily reduced by a variety of means, most of which involve removal of the DC component of the demodulated signal.

U.S. Pat. No. 3,566,258 describes an eddy-current flaw detector utilizing a quadrature feedback system which maintains the signals from an induction balance bridge in a relatively nulled condition under steady-state conditions. Signals from material flaws which move rapidly past the bridge are not nulled out provided that their duration is not substantially longer than the response time constant of the nulling system. A synchronous demodulator distinct from the synchronous demodulator comprising a portion of the feedback system is used to minimize sensitivity to signals of a particular phase, or to distinguish between discontinuities in the material of two different characters. A metal detector operating on this principle could provide detection and classification of metal objects buried in the soil, however, relatively low concentrations of magnetically susceptible minerals in the soil would impair the performance of the apparatus. In addition, such a metal detector would require that the operator maintain the sensor in motion in order to detect the metal object. The quadrature feedback system described in this patent is stabilized with a low pass filter, and this system does not completely null out steady state signals. Moreover, the system does not address the problems of phase inaccuracy and instability, these problems usually being of little consequence in the eddy-current flaw detection apparatus.

U.S. Pat. No. 4,514,692 describes a metal detector which differentiates synchronously demodulated signals in order to minimize the effects of soil minerals, sensor misalignment, and phase drift. This metal detector eliminates the need for operator phase adjustments and discriminates between different classes of metal objects, but the search coil sensor assembly must be maintained in motion relative to the object in order to detect it, and the performance of this apparatus is impaired when used to search in soils containing more than about one percent magnetite.

U.S. Pat. No. 3,686,564 describes a weapons detection and classification system which utilizes a plurality of oscillators to energize multiple frequency transmitting means, and a receiver comprising synchronous demodulators operating at the various transmitted frequencies. The various demodulated signals are then jointly analyzed to determine the probable type of object within the transmitted field, in particular whether or not the object may be a weapon. A metal detector utilizing this approach would be very complex to manufacture, and it still would not solve the problem of operator phase adjustments.

U.S. Pat. No. 3,614,600 describes electromagnetic prospecting apparatus for use in an airplane to detect electrically conductive ore bodies. This apparatus utilizes ambient magnetic fields, natural or manmade, to "illuminate" the geologic zone in question, no transmitter being specifically provided. The secondary magnetic fields emanating from ore bodies are sensed by a receiving coil, then bandpassed and amplified, and demodulated by two synchronous demodulators whose phase references are in quadrature and are derived from a coil oriented othogonally with respect to the receiving coil. The outputs from the demodulators are fed to motors of servo chart recorders, the feedback potentiometers of which modulate the respective phase reference signals and feed them back to the receive coil to create a steadystate null. Substituting electronic integrators and indicating means for the chart recorders, one could theoretically use such apparatus for detecting metal objects. However, such a metal detector would exhibit very poor sensitivity.

It is in general an object of the invention to provide a new and improved metal detector which overcomes the foregoing and other difficulties of metal detectors heretofore provided.

Another object of the invention is to provide a metal detector of the above character which is sufficiently precise and stable that operator phase adjustments may be eliminated.

Another object of the invention is to provide a metal detector of the above character which does not require the operator to maintain the sensor in motion relative to the object to be detected.

Another object of the invention is to provide a metal detector of the above character which can classify metal objects according to their phase characteristics, while eliminating interference from magnetic minerals even in soils containing more than one percent of magnetite.

These and other objects are achieved in accordance with the invention by providing a metal detector having transmitting and receiving coils movable relative to the ground and the object to be detected. The transmitting coil is energized with an alternating electric current to provide an alternating magnetic field. The receiving coil produces an AC voltage in accordance with its mutual inductance with the transmitter coil, and in accordance with electrically conductive and/or magnetically susceptible objects or materials within the zone of mutual coupling between the transmitter coil and the receiver coil.

A phase-sensitive integral control servo loop maintains the signal from the receiving coil in a nulled condition for that component of the receiving coil signal which corresponds to the phase and frequency of the servo loop. The phase of the servo loop is determined by a precision phase reference which senses the phase of the transmitted field, thereby allowing the servo loop to precisely null out the effects of inductive coupling changes such as are typically caused by soil minerals and sensor assembly misalignment. Because the null is produced prior to bandpass filtering of the received signals, and because the phase reference signal is obtained by precision means, there is no need for the operator to align the phase of the circuitry. The remaining (un-nulled) component of the received signal is then demodulated to provide an indication of the presence of a metal object within the response zone of the receiver coil.

In one disclosed embodiment which is particularly suitable for classifying metal objects in environments other than highly mineralized soils, the signals from the demodulator and the integrated control voltage of the servo loop are compared to provide an indication of the electrical properties of the object in question.

In another disclosed embodiment which is particularly suitable for classifying metal objects in highly mineralized soils, the transmitting coil transmits a signal rich in harmonics. The servo loop is made sensitive to the strongest harmonic frequency, while nulling out inductive coupling signals at both the strongest harmonic and the fundamental frequency. An additional synchronous demodulator is provided, which is sensitive to signals at the fundamental frequency which are at the phase corresponding to the reactive (inductive) component of signals from metal objects. The magnitudes of the signals from the first and the additional demodulators are compared, their ratio being an indication of the electrical properties of the object being detected.

Figure 1:
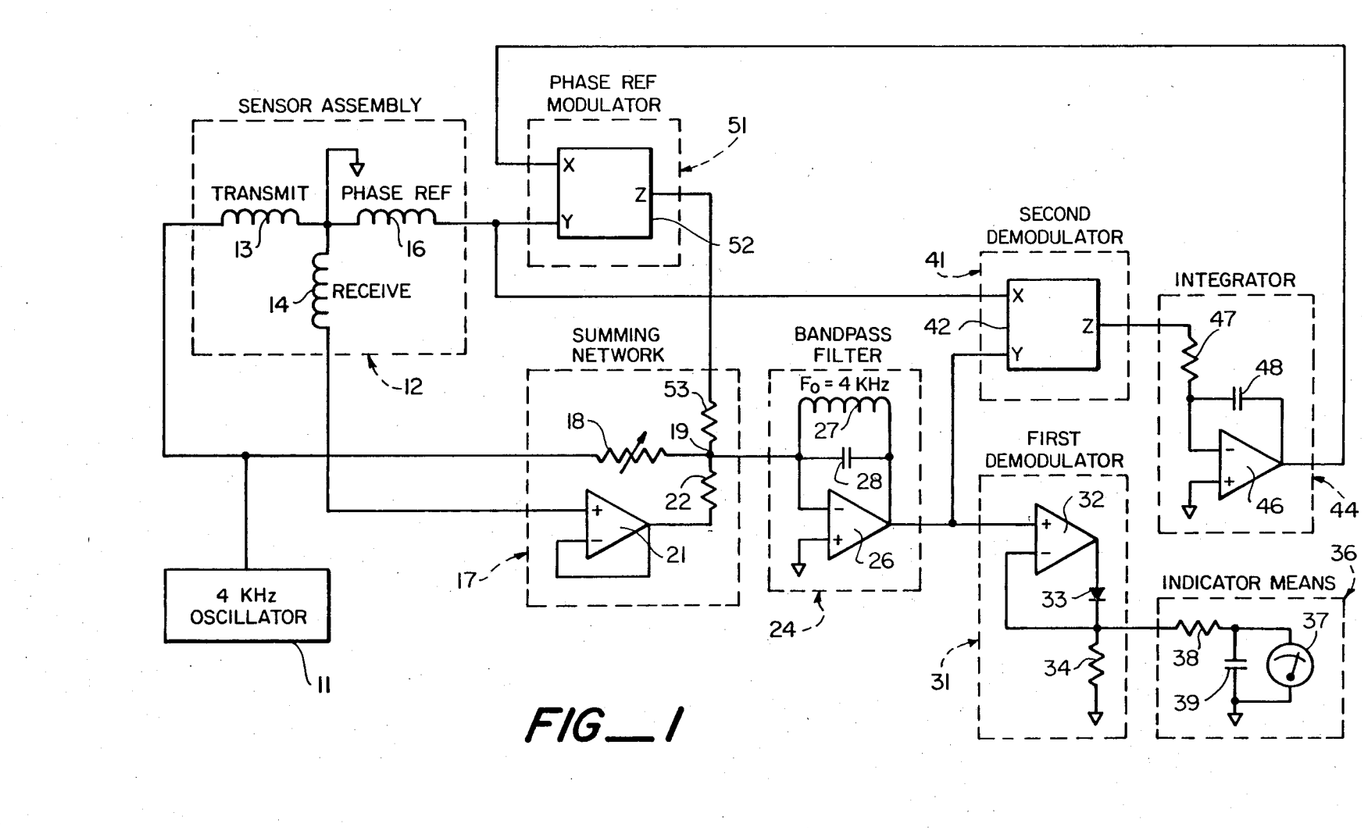
FIG. 1 is a block diagram of one embodiment of a metal detector according to the invention.

The embodiment illustrated in FIG. 1 is a non-classifying metal detector with precision phase circuitry which eliminates the need for operator phase adjustments and does not require movement of the sensor relative to the object to be detected. This embodiment includes an oscillator 11 which operates at a suitable frequency on the order of 100 Hz to 100 KHz. In one presently preferred embodiment, the oscillator produces a sine wave of relatively low distortion at a frequency of 4 KHz. However, any other suitable waveform can be utilized.

The metal detector also includes a sensor assembly 12 which includes a transmitting coil 13, a receiving coil 14, and a phase reference coil 16. These coils are mounted in fixed positions in a housing (not shown) which can be swung back and forth, or otherwise moved about, by the operator over the surface of the ground. The receiving coil is preferably positioned to be in approximate inductive balance relative to the transmitting coil, and the phase reference coil is positioned to be well-coupled inductively to the transmitting coil. The signal from oscillator 11 is applied to the transmitting coil to produce an alternating magnetic field in the vicinity of the sensing head.

The signals from oscillator 11 and receiving coil 14 are applied to two inputs of a summing network 17. This network includes a variable resistor 18 connected between the output of the oscillator and the summing node 19. The receiving coil is connected to the input of a buffering amplifier 21, and the output of this amplifier is connected to the summing node by a resistor 22.

The output of summing network 17 is connected to the input of a bandpass filter 24 which comprises an operational amplifier 26 having an inductor 27 and a capacitor 28 connected between its output and inverting input terminals. The filter is tuned to pass the received signal (e.g., 4 KHz) and to remove interference signals from power lines, radio stations and the like.

The output of bandpass filter 24 is connected to the input of a demodulator 31 comprising an operational amplifier 32 having a diode 33 and a resistor 34 connected in series at its output, with the junction of the diode and the resistor being connected back to the inverting input of the amplifier so that the demodulator functions as a precision rectifier.

The output of demodulator 31 is connected to an indicator 36 comprising a current responsive meter 37. The output signal from the demodulator is applied to the meter through a current limiting resistor 38, and the meter is shunted by a capacitor 39. As discussed more fully hereinafter, meter 37 provides a visual indication when a metal object is detected in the magnetic field of the transmitting coil. Any other suitable type of indicator can be used, if desired, for example an audible tone.

Distortions in the transmitted field can be caused by the presence of magnetically susceptible materials or objects and by mechanical misalignment of the receiving and transmitting coils. These distortions produce signals in the receiving coil which can interfere with the detection of a desired signal from a metal object. These undesired signals (reactive phase signals) are generally out of phase with the desired signals.

Means is provided for eliminating the undesired reactive phase component from the signals applied to indicator 36. This means includes a second demodulator 41 which synchronously demodulates the signal from bandpass filter 24 at the approximate phase of the reactive component of the received signal. Demodulator 41 comprises an analog multiplier having one input connected to the output of the bandpass filter. The second input of multipler 42 is connected to phase reference coil 16, which provides a phase reference signal in phase with the reactive component of the received signal.

The output of demodulator 41 is applied to an integrator 44 comprising an operational amplifier 46 having an input resistor 47 and an integrating capacitor 48 connected between its output and inverting input terminals. The values of resistor 47 and capacitor 48 are selected to provide a time constant which is great enough to effectively eliminate any component which is present at the output of demodulator 41 at twice the frequency of oscillator 11.

The output of integrator 44 is connected to one input of a phase reference modulator 51. This modulator comprises an analog multiplier 52 having a second input to which the phase reference signal from coil 16 is applied. The output of modulator 51 is connected to a third resistor 53 of summation network 17 for combination with the received signal and the signal from oscillator 11.

The magnitude and the sign of the signal applied to summing network 17 by phase reference modulator 51 are determined by the output signal from integrator 44. When the sum of a received reactive signal and the modulated reference phase signal is not zero, the remaining reactive signal is coupled to demodulator 41, and the resulting demodulated signal causes the integrator to slew in the direction that will cause the phase reference modulator to deliver a signal to the summing network that will oppose the received reactive signal. When a null condition is reached, reactive signals are no longer present at demodulator 41, the output of this demodulator reaches zero, the integrator stops slewing, and the null condition is maintained. In this manner, the reactive components of the received signals are continuously tracked and nulled out with no appreciable phase error, notwithstanding any phase shift which may occur in the signal from the bandpass filter. This is a significant advantage since inexpensive bandpass filters built according to the present art are subject to substantial phase shift and phase drift, and the phase of the reactive signals passed by the bandpass filter may be shifted by as much as 10 or 20 degrees.

The variable resistor 18 in the summing network is adjusted to null out steady-state signals which are in phase quadrature relative to reactive signals. Such signals may, for example, be caused by the presence of conductive materials within the response zone of the sensor, particularly the wire which forms the coil. Such signals are sometimes referred to as "resistive" phase signals to distinguish them from the reactive phase signals. With the variable resistor adjusted to null out steady-state resistive signals, when a metal object comes into the field of the sensor, the resistive component produced by this object passes through the summing network without being nulled out by the balancing signal from phase reference modulator 51. This signal then passes through bandpass filter 24 and is demodulated by demodulator 31 to actuate indicator 36.

Once variable resistor 18 has been adjusted to null out steady-state resistive signals, indicator 36 will indicate the presence of a metal object within the response zone of the sensor despite the presence of magnetically susceptible minerals, since the precision reactive nulling circuitry keeps signals from such minerals nulled out. At the same time, the indicator will indicate the presence of a metal object within the response zone of the sensor, whether or not magnetically susceptible materials are also present, since the resistive component of signals produced by such objects is not nulled out.

In this embodiment and in the other embodiments disclosed, the phase reference signal utilized in nulling the reactive component of the received signals bears a precise and known phase relationship to the transmitted field. This relationship is significant because it provides accurate and complete nulling of the undesired component with no manual phase adjustments on the part of the operator. In the embodiment of FIG. 1, the precise phase relationship is achieved by inducing a voltage in phase reference coil 16 which is precisely 90° out of phase with the current in transmitting coil 13 and the transmitted field. The phase of the voltage developed across coil 16 is thus precisely 90 degrees ahead of the excitation current and the transmitted field. This constitutes a significant improvement over prior art systems in which a phase reference signal is derived from the voltage across the transmitting coil which can differ in phase by as much as 5–20 degrees from quadrature relative to the transmitted field due to the impedance of the coil. This impedance is not always known, and it can change with temperature and other ambient conditions, requiring frequent readjustment of the phase reference signal by the operator. With the invention, no such phase adjustment is required.

The use of integrator 44 in the feedback loop results in more complete nulling of the undesired reactive signal components than would otherwise be possible. The integrator has a very high gain and a slew rate which varies in accordance with the magnitude of the reactive component at the input of demodulator 41. Any deviation from the desired null results in the immediate generation of a corrective signal which restores the null almost instantaneously. This represents a significant improvement over systems utilizing a low pass filter with fixed gain in a feedback loop to null the undesired reactive component.

Figure 2:
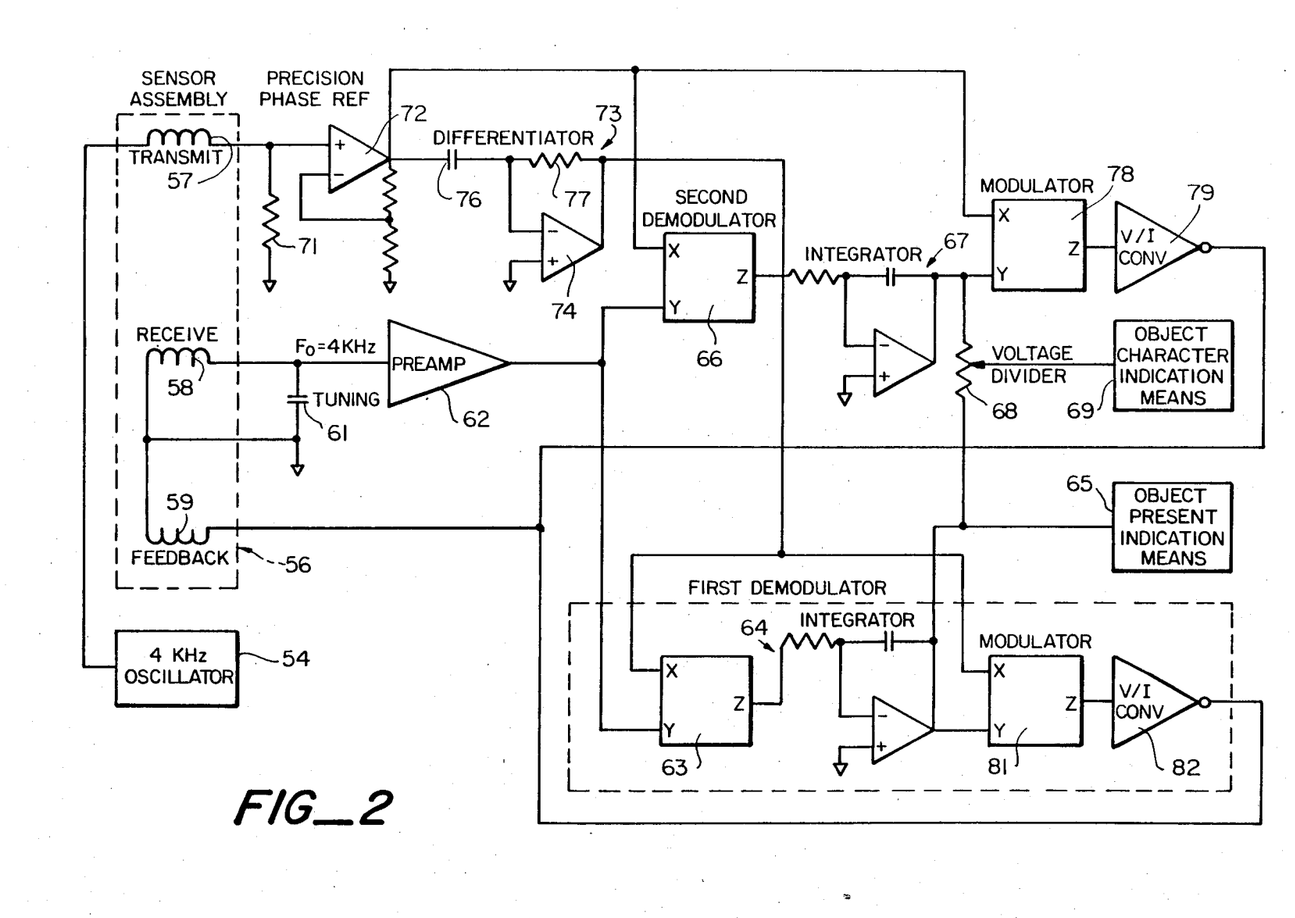
FIG. 2 is a block diagram of a second embodiment of a metal detector according to the invention.

The embodiment illustrated in FIG. 2 is a classifying-type metal detector with precision phase circuitry which eliminates the need for operator phase adjustments and does not require motion of the sensor relative to a metal object to be detected. This embodiment is particularly suitable for use in environments where the magnetic susceptibility of the soil is low.

This embodiment includes an oscillator 54 which is generally similar to oscillator 11, and a sensor assembly 56 which comprises a transmitting coil 57, a receiving coil 58 and a feedback coil 59. Receiving coil 58 is positioned to be in approximate inductive balance relative to transmitting coil 57, and feedback coil 59 is coupled inductively to receiving coil 58. Oscillator 54 is connected to transmitting coil 57 to produce an alternating magnetic field.

A tuning capacitor 61 is connected across receiving coil 58 to form a tuned circuit which is resonant at the frequency of oscillator 54, e.g. 4 KHz. The tuned circuit serves as a bandpass filter, and t-he tuning capacitor causes the phase of received signals to be shifted by approximately 90 degrees, with a phase uncertainty on the order of 10–20 degrees. Signals from the receiving coil are applied to the input of a preamplifier 62 which can include additional bandpass circuitry, if desired.

The output of preamplifier 62 is connected to one input of a demodulator 63 which synchronously demodulates the received signal at the phase of the resistive component. The demodulated resistive component is applied to the input of an integrator 64, and the output of the integrator is connected to an indicator 65 which indicates when a metal object is detected in the field of the transmitting and receiving coils.

The output of preamplifier 62 is also connected to one input of a second demodulator 66 which synchronously demodulates the received signals at the phase of the reactive component of the received signal. The output of demodulator 66 is connected to the input of an integrator 67. The output of this integrator and the output of integrator 64 are connected to a voltage dividing potentiometer 68 which provides an output signal having a polarity corresponding to the character of the detected object. This signal is applied to a polarity responsive indicator 69 to indicate the character of the object.

Means is included for providing precision phase reference signals for demodulators 63, 66. This means includes a resistor 71 which is connected in series with transmitting coil 57. The signal developed across this resistor is precisely in phase with the excitation current applied to coil 57, and hence with the transmitted field, notwithstanding the uncertainties which may exist between the phase of the voltage developed across the transmitting coil and the phase of the transmitted field.

The signal developed across resistor 71 is applied to the input of a phase reference amplifier 72 which buffers and amplifies the signal to provide a precision phase reference signal. The signal at the output of amplifier 72 is in phase with the transmitted signal and the reactive component of the received signal, and it is applied to demodulator 66 to demodulate the reactive component of the received signal.

The output of amplifier 72 is also connected to a differentiator 73 which provides a quadrature reference signal in phase quadrature with the precision phase reference signal. The differentiator comprises an operational amplifier 74 with an input capacitor 76 and a resistor 77 connected between its output and inverting input terminals. The signal at the output of differentiator 73 is in phase with the resistive component of the received signal, and it is applied to demodulator 63 to demodulate the resistive component.

The output of integrator 67 is connected to one input of a modulator 78 which comprises an analog multiplier. The precision phase reference signal from amplifier 72 is applied to a second input of this modulator, and the output of the modulator is connected to the input of a voltage-to-current converter 79. The output of this converter is connected to feedback coil 59.

Similarly, the output of integrator 64 is connected to one input of a modulator 81 which comprises an analog multiplier. The quadrature reference signal from differentiator 73 is applied to a second input of this modulator, and the output of this modulator is connected to the input of a voltage-to-current converter 82. The output of this converter is also connected to feedback coil 59.

Demodulator 66 demodulates the received signals at the phase of the precision phase reference signal from amplifier 72, and the demodulated signal is integrated by integrator 67, causing the integrator to slew. The output of the integrator determines the magnitude and polarity of a precision phase reference signal which is coupled via modulator 78 from the precision phase reference circuit to converter 79. Since the phase of the current flowing through the feedback coil from this converter is the same as the phase of the current in the transmitting coil, the feedback coil can null out reactive signals in the receiving coil which are produced by magnetically susceptible materials in the soil or by changes in the coupling between the transmitting and receiving coils.

Whenever a net reactive signal is present in the receiving coil, it causes integrator 67 to slew in the direction of null until the current flowing through feedback coil 59 has been adjusted by modulator 78 to be just sufficient to produce a null. When a null has been achieved, reactive signals are no longer present at the input to demodulator 66, and the absence of a demodulated signal causes integrator 67 to stop slewing.

The nulling system formed by demodulator 63, integrator 64, modulator 81 and converter 82 operates in a similar manner with respect to the resistive component of the received signal. The two nulling systems share the same feedback coil 59, receiving coil 58, tuning capacitor 61 and preamplifier 62. With two nulling circuits being provided, one of reactive phase and the other of resistive phase, the received signal is continuously maintained in a nulled condition. The output voltages of integrators 64, 67 correspond to the strengths of the components of the phases being received, and the two nulling systems can thus serve as resistive and reactive demodulators.

In the absence of a resistive nulling system, i.e. if demodulator 63 were of conventional design without feedback circuitry, then the output voltage of integrator 67 would exhibit some response to the resistive component of the received signals due to phase inaccuracies in the bandpass filter and preamplifier. Likewise, if there were no reactive signal nulling system, reactive signals present at the input of demodulator 63 would cause interference with the demodulated output in the presence of phase inaccuracies in the bandpass filter and preamplifier. When the two nulling systems are combined, however, received signals are maintained in a nulled condition, and phase inaccuracies in the bandpass filtered preamplifier are of no consequence as long as they are not so great as to interfere with good transient response of the feedback systems.

The combination of the two nulling systems operating in quadrature, with their control voltages being utilized as demodulated signals, provides a demodulation system of exceptionally accurate phase response even though the bandpass filter of the system may exhibit considerable phase inaccuracy.

Metallic objects introduced into the response zone of the sensor produce signals in the receiving coil which have both reactive and resistive components, with the ratio of the resistive component to the reactive component corresponding to the tangent of the loss phase angle of the object in question. The polarity of the output signal from potentiometer 68 is dependent upon this ratio, and with the potentiometer set for a desired discrimination phase, indicator 69 indicates whether a particular metal object is classified in one phase group or another.

Figure 3:
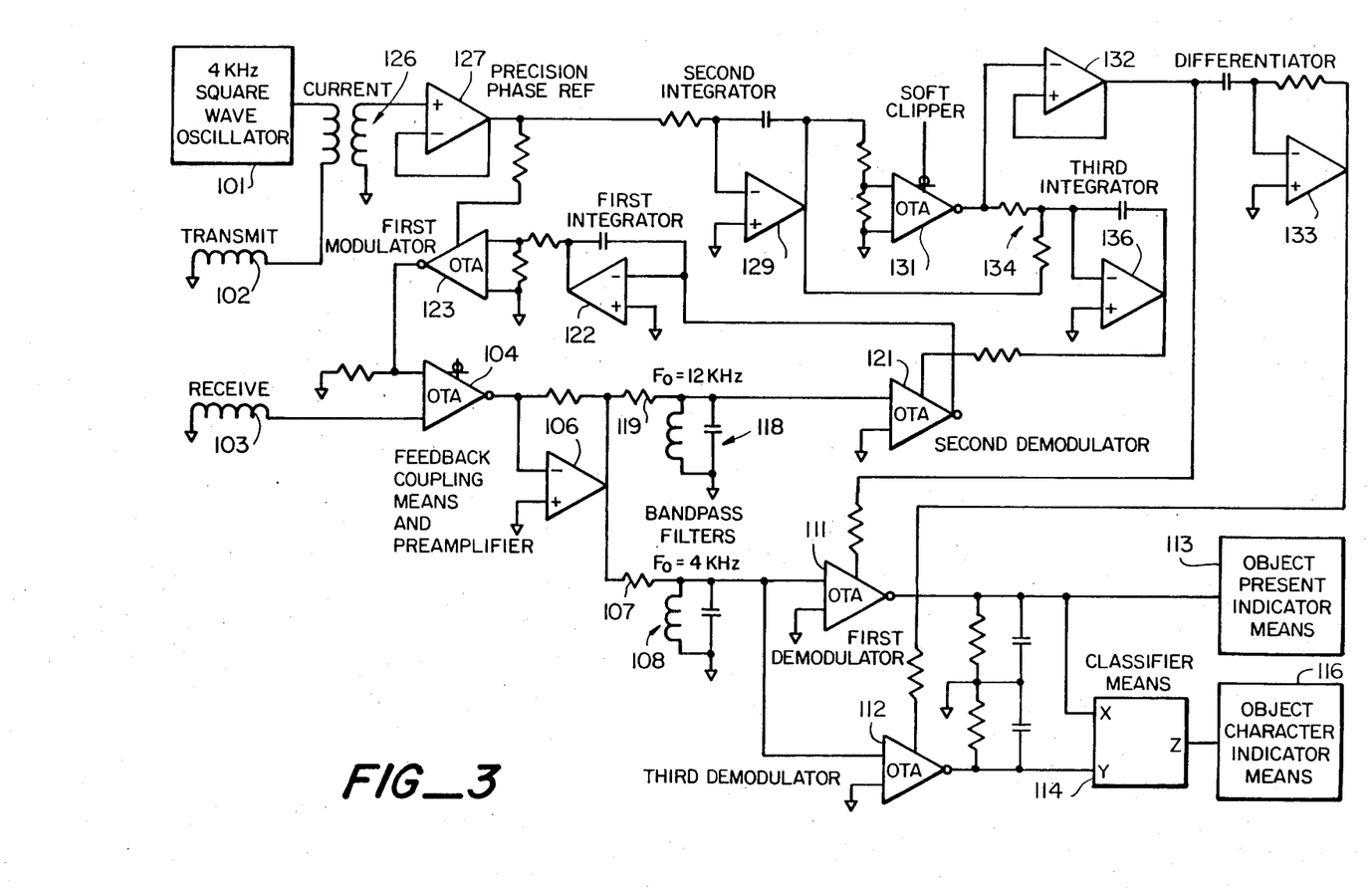
FIG. 3 is a block diagram of a third embodiment of a metal detector according to the invention.

The embodiment of FIG. 3 is another classifying-type metal detector which eliminates the need for operator phase adjustments and does not require motion of the sensor relative to an object to be detected and classified.

This embodiment is particularly suitable for use in classifying metal objects in soils containing high concentrations of magnetically susceptible materials.

The embodiment of FIG. 3 includes an oscillator 101 which produces a square wave of suitable frequency, e.g. 4 KHz. This oscillator energizes a transmitting coil 102 to produce an alternating magnetic field.

A receiving coil 103 is located in proximity to transmitting coil 102 and is positioned to minimize mutual inductance between the transmitting and receiving coils. The receiving coil is connected to one input of an operational transconductance amplifier 104, and the output of this amplifier is connected to the inverting input of an operational amplifier 106. These amplifiers serve as a buffer for the receiving coil and as a preamplifier for the received signal.

The output of amplifier 106 is coupled by a resistor 107 to the input of a bandpass filter 108 which is tuned to the fundamental frequency of the transmitted signal, e.g. 4 KHz. This filter serves to filter out noise from interfering sources such as power lines and radio stations.

The output of filter 108 is connected to the inputs of demodulators 111, 112 which synchronously demodulate the filtered signal at the respective phases of the resistive and reactive components of the received signal. The output of demodulator 111 is connected to an indicator 113 which indicates when a metallic object is detected in the field of the transmitting and receiving coils. The outputs of the two demodulators are applied to the inputs of an analog divider 114 which divides the demodulated resistive component by the demodulated reactive component to provide an output signal corresponding to the character of the detected object. This signal is applied to an indicator 116, such as a current-responsive meter, which indicates the character of the object.

The output of preamplifier 106 is connected to a second bandpass filter 118 by a resistor 119. This filter is tuned to pass the third harmonic of the signal from oscillator 101, e.g. a 12 KHz filter for an oscillator frequency of 4 KHz. The third harmonic signal from filter 118 is applied to the input of a demodulator 121 where it is synchronously demodulated at the phase of the reactive component to produce a demodulated signal representative of the reactive component of the 12 KHz signal.

The output of demodulator 121 is connected to the input of an integrator 122, and the output of this integrator is connected to the input of a modulator 123 which modulates a precision phase reference signal in accordance with the output of the integrator. The output of the modulator is fed back to a second input of amplifier 104 where it is internally combined with the signal from receiving coil 103 to maintain the reactive signals at the third harmonic frequency in a null condition. At the same time, induction imbalance signals at the fundamental frequency (4 KHz) are automatically nulled because the signal fed back to the preamplifier contains fundamental and third harmonic components in the same ratio as received signals resulting from induction imbalance. Thus, although the feedback loop is sensitive only to imbalances at the third harmonic frequency, it corrects imbalances at the fundamental frequency as well.

Received signals from metal objects contain reactive components at the fundamental and third harmonic frequencies which are in different ratios than those caused by induction imbalance. Consequently, the reactive nulling system does not null out the 4 KHz or fundamental reactive component of the signal from a metal object, and the remaining signal is available for demodulation by demodulator 112.

In the embodiment of FIG. 3, the precision phase reference signal is provided by a current transformer 126 and a phase reference amplifier 127. The current transformer has a primary winding connected electrically in series with transmitting coil 102, and a secondary winding connected to the input of amplifier 127. Thus, the current in the primary winding of the transformer is precisely in phase with the current in the transmitting coil and, hence, with the transmitted field. The output of amplifier 127 is connected to the phase reference signal input of modulator 123.

The performance requirements of the bandpass filters in the embodiment of FIG. 3 can be somewhat relaxed if the phase reference signals supplied to demodulator 111, 112 and 121 are relatively free of frequency components other than the frequency to be demodulated by the particular demodulator. The precision phase reference signal from amplifier 127 is a square wave of generally rectangular waveform, and it is applied to the input of an integrator 129 which converts the rectangular waveform to a triangular waveform. The output of integrator 129 is connected to the input of a clipping circuit 131 comprising an operational transconductance amplifier. This circuit effects a "soft" clipping of the triangular waveform, producing a sine wave at the fundamental frequency which is relatively free of harmonic distortion. The sine wave from the clipper is buffered by an amplifier 132 and applied to the phase reference input of demodulator 111.

The buffered sine wave from clipper 131 is also applied to the input of a differentiator 133 which shifts the phase of the sine wave by 90 degrees, and this phase shifted signal is applied to the phase reference input of demodulator 112.

The sine wave from clipper 131 is subtracted from the triangular wave from integrator 129 in a summation network 134 to eliminate the fundamental frequency component of the triangular wave, and the resulting signal is applied to an integrator 136 to de-emphasize higher order harmonics and to shift the phase of the signal from resistive to reactive. The resulting third harmonic signal from integrator 136 is applied to the phase reference input of demodulator 121. Alternatively this third harmonic component can be obtained by subtracting the sine wave signal from differentiator 133 from the square wave signal from precision phase reference 127.

The invention has a number of important features and advantages. It provides a metal detector which has excellent immunity to soil mineralization interference, yet has the ability to detect objects buried in mineralized soil. Since the proper phase relationships are fixed in advance by means which are inherently precise and stable, there is no need for the operator to make phase adjustments by going through the "ground compensation" procedure required with most prior art metal detectors having a mineral nulling capability.

The ability to accurately classify objects is greatly improved in a metal detector built in accordance with the invention which is designed for use in highly mineralized soils, while at the same time the need to maintain the sensor in motion relative to the object to be classified is eliminated. In a metal detector built in accordance with the invention which is designed for use in non-mineralized soils or for use in media other than soil, objects can be classified with extremely good accuracy due to the practical elimination of phase errors. The invention presents no particular problems with manufacturability, and in some respects offers improved manufacturability particularly in the realm of factory presetting of phase and in the relaxed requirements for precision in the manufacture of induction balance sensors.

It is apparent from the foregoing that a new and improved metal detector has been provided. While only certain presently preferred embodiments have been described in detail, as will be apparent to those familiar with the art, certain changes and modifications can be made without departing from the scope of the invention as defined by the following claims.

We claim:

1. In apparatus for locating a metal object: a transmitting coil, means for applying a square wave excitation voltage to the transmitting coil to transmit an alternating magnetic field, a receiving coil located within the transmitted field for producing a signal having components of different phases corresponding to metal objects and other disturbances in the field, first and second synchronous demodulators for demodulating the received signal at the phase of the transmitted field and in quadrature with the phase of the transmitted field, means for providing a square wave signal in quadrature with the transmitted field, an integrator for providing a signal of generally triangular waveform in response to the square wave signal in quadrature with the transmitted field, means for clipping the triangular signal to provide a sinusoidal signal at the fundamental frequency of the magnetic field, means for applying the sinusoidal signal to the first demodulator, a differentiator responsive to the sinusoidal signal for providing a signal which is shifted in phase by 90 degrees with respect to the sinusoidal signal, means for applying the phase shifted signal to the second demodulator, means responsive to one of the demodulated signals for indicating the presence of a metal object in the field, a bandpass filter responsive to the received signal for passing a signal corresponding to the third harmonic of the received signal, a third synchronous demodulator for demodulating the third harmonic signal at the phase of the transmitted field, means for applying a reference phase signal to the third demodulator at the phase of the transmitted field, means for integrating the demodulated third harmonic signal, means responsive to the integrated signal for proving a correction signal in phase with the transmitted field, and means for combining the correction signal with the received signal to null out a component of said signal of the phase of the transmitted field.

2. The apparatus of claim 1 wherein the means for applying a reference phase signal to the third demodulator includes means for combining the triangular signal and the sinusoidal signal.

3. In apparatus for locating a metal object: a transmitting coil, means for energizing the transmitting coil with a square wave signal having fundamental and harmonically related frequency components to produce an alternating magnetic field, a receiving coil positioned in the magnetic field for providing a signal having components at the fundamental and harmonically related frequencies with resistive and reactive phase components corresponding to metal objects and other disturbances in the field, the reactive phase components being present in different ratios at the fundamental and harmonically related frequencies with metal objects and with other disturbances, means responsive to the reactive phase component at one of the frequencies for providing a correction signal at the reactive phase with fundamental and harmonically related frequency components in the same ratio as the signal produced by a disturbance, means for combining the correction signal with the received signal to null out the reactive phase components produced by the disturbance at the fundamental and harmonically related frequencies and to null out the reactive phase components produced by metal objects at the one frequency, and means responsive to the remaining components of the received signal for indicating the presence of a metal object in the field.

4. The apparatus of claim 3 wherein the means for indicating the presence of a metal object includes means for demodulating the remaining components of the received signal.

5. The apparatus of claim 3 wherein the means for providing the correction signal comprises a feedback network.

6. The apparatus of claim 3 wherein the means for providing the correction signal comprises a bandpass filter for passing components of the received signal at the one frequency, a demodulator for demodulating the signal from the filter at the phase of the reactive components, and means for integrating the demodulated signal.

7. The apparatus of claim 3 wherein the means for combining the correction signal with the received signal includes a differential amplifier, with the received signal being applied to one input of the differential amplifier, and the correction signal being applied to the other input of the amplifier.

8. In apparatus for locating a metal object: a transmitting coil, means for applying a square wave excitation voltage to the transmitting coil to transmit an alternating magnetic field, a receiving coil located within the transmitted field for producing a signal having components of different phases corresponding to metal objects and other disturbances in the field, first and second synchronous demodulators for demodulating the received signal at the phase of the transmitted field and in quadrature with the phase of the transmitted field, means for differentiating the current in the transmitting coil to provide a substantially square wave signal in quadrature with the transmitted field, an integrator for providing a signal of generally triangular waveform in response to the square wave signal, means for clipping the triangular signal to provide a sinusoidal signal at the fundamental frequency of the magnetic field, means for applying the sinusoidal signal to the first demodulator, a differentiator responsive to the sinusoidal signal for providing a signal which is shifted in phase by 90 degrees with respect to the sinusoidal signal, means for applying the phase shifted signal to the second demodulator, and means responsive to at least one of the demodulated signals for indicating the presence of a metal object in the field.

9. The apparatus of claim 8 including a bandpass filter responsive to the received signal for passing a signal corresponding to the third harmonic of the received signal, a third synchronous demodulator for demodulating the third harmonic signal at the phase of the transmitted field, means for applying a reference phase signal to the third demodulator at the phase of the transmitted field, means for integrating the demodulated third harmonic signal, means for combining the integrated signal with the square wave signal in quadrature with the transmitted field to provide a correction signal in phase with the transmitted field, and means for combining the correction signal with the received signal to null out the components of said signal at the phase of the transmitted field.

10. In apparatus for detecting conductive objects: an induction balance coil assembly comprising a transmitter coil and a receiver coil in induction balance relative to the transmitter coil, means for applying a square wave alternating voltage to the transmitter coil, whereby the transmitter coil transmits an alternating magnetic field, fundamental phase reference means which produces phase reference signals at the fundamental frequency of the square wave alternating voltage, harmonic phase reference means which produces phase reference signals at one or more frequencies which are odd harmonics of the square wave alternating voltage, synchronous demodulator means which demodulates signals from the receiver coil in accordance with their frequency and phase components as determined by the fundamental and harmonic phase reference signals, and object presence indicator means responsive to one of the demodulated signals from the sychronous demodulator means.

11. The apparatus of claim 10 including object discrimination means, comprising summing means responsive to the signals from the synchronous demodulator means which sums the signals in such a ratio as will produce a positive result on objects of one electrical character and a negative result on objects of another electrical character.

12. The apparatus of claim 10 including object classification means, comprising division means which computes the ratio of signals from the synchronous demodulator means, the ratio corresponding to the electrical character of the object.

13. The apparatus of claim 10 wherein the phase reference means includes means for producing a phase reference signal corresponding to the reactive component at one of the frequencies, and the synchronous demodulator means includes means for providing a demodulated signal corresponding to the reactive component at one of the frequencies, together with an integrator which integrates the demodulated signal corresponding to the reactive component at one of the frequencies, a current sensor which produces a signal corresponding to the first derivative of the current flowing in the transmitter coil, an amplitude modulator which modulates the amplitude and sign of the signal from the current sensor in accordance with the amplitude and sign of the signal from the integrator, and combining means which combines the signal from the receiver coil with the signal from the amplitude modulator in opposing phase, producing a null with respect to signals caused by induction imbalance at the fundamental and harmonic frequencies simultaneously.

* * * * *